United States Patent
Berry et al.

(10) Patent No.: US 11,385,881 B2
(45) Date of Patent: Jul. 12, 2022

(54) STATE-DRIVEN VIRTUALIZATION SYSTEM IMAGING

(71) Applicant: Nutanix, Inc., San Jose, CA (US)

(72) Inventors: Joshua John Berry, Redwood City, CA (US); Mohan Maturi, San Jose, CA (US); Shlomo Shlomi Vaknin, San Jose, CA (US)

(73) Assignee: Nutanix, Inc.

( * ) Notice: Subject to any disclaimer, the term of this patent is extended or adjusted under 35 U.S.C. 154(b) by 0 days.

(21) Appl. No.: 17/086,392

(22) Filed: Oct. 31, 2020

(65) Prior Publication Data
US 2022/0137946 A1  May 5, 2022

(51) Int. Cl.
*G06F 8/61* (2018.01)
*G06F 8/53* (2018.01)
*G06F 16/14* (2019.01)
*G06F 9/455* (2018.01)

(52) U.S. Cl.
CPC .............. *G06F 8/63* (2013.01); *G06F 8/53* (2013.01); *G06F 9/45558* (2013.01); *G06F 16/148* (2019.01); *G06F 2009/45562* (2013.01); *G06F 2009/45595* (2013.01)

(58) Field of Classification Search
CPC . G06F 8/63; G06F 16/148; G06F 8/53; G06F 9/45558; G06F 2009/45562; G06F 2009/45595
See application file for complete search history.

(56) References Cited

U.S. PATENT DOCUMENTS

| 8,176,094 B2 | 5/2012 | Friedman |
| 8,549,518 B1 | 10/2013 | Aron et al. |
| 8,601,473 B1 | 12/2013 | Aron et al. |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Phillip H Nguyen
(74) *Attorney, Agent, or Firm* — Vista IP Law Group, LLP

(57) ABSTRACT

A method for forming a virtualization system image. A specification of an expressed end state of a virtualization system image is analyzed. The specification is decomposed into lower level specifications and the lower level specifications are decomposed into idempotent operations. The virtualization system image corresponding to the expressed end state is assembled by processing the idempotent operations. The expressed end state, decomposed lower level intents, and decomposed idempotent operations are codified into a decomposition hierarchy. The decomposition hierarchy is query-able such that, for a given intent, an idempotent operation is returned. An idempotent operation code library is query-able such that, for a given idempotent operation, a corresponding set of executable code is returned. An image builder executes the executable code. When all of the idempotent operations have been successfully executed, the virtualization system image is complete. A virtualization system image is deployed to computing nodes that constitute a computing cluster.

24 Claims, 12 Drawing Sheets

(56) References Cited

U.S. PATENT DOCUMENTS

| | | | |
|---|---|---|---|
| 8,850,130 B1 | 9/2014 | Aron et al. | |
| 9,063,815 B2 | 6/2015 | Kundu et al. | |
| 9,262,366 B2* | 2/2016 | Lenzmeier | G06F 15/16 |
| 9,772,866 B1 | 9/2017 | Aron et al. | |
| 10,338,946 B1* | 7/2019 | Allen | G06F 9/45533 |
| 2009/0089860 A1* | 4/2009 | Forrester | H04L 9/3236 726/3 |
| 2010/0088699 A1 | 4/2010 | Sasaki | |
| 2012/0246645 A1* | 9/2012 | Iikura | G06F 8/61 718/1 |
| 2012/0311574 A1* | 12/2012 | Song | G06F 11/3058 718/1 |
| 2012/0324446 A1* | 12/2012 | Fries | G06F 9/45504 718/1 |
| 2013/0232484 A1* | 9/2013 | Chieu | G06F 9/45558 718/1 |
| 2013/0246596 A1* | 9/2013 | Fujiwara | H04L 41/08 709/223 |
| 2015/0264122 A1* | 9/2015 | Shau | G06F 9/5088 709/203 |
| 2018/0260433 A1* | 9/2018 | Ichihashi | G06F 8/30 |
| 2019/0140905 A1* | 5/2019 | Vembuli | G06F 9/5077 |
| 2021/0311715 A1* | 10/2021 | Dirks | G06F 9/45558 |
| 2021/0311717 A1* | 10/2021 | Haryadi | G06F 9/45516 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from https://nutanxbible.com/ (Publication date based on indicated capture date by Archive.org; first publication date unknown).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

Poitras, Steven. "The Nutanix Bible" (Jan. 30, 2021), from https://nutanixbible.com/ (Publication date based on indicated capture date by Archive.org; first publication date unknown).

Cano, I. et al., "Curator: Self-Managing Storage for Enterprise Clusters", *14th USENIX Symposium on Networked Systems Design and Implementation , NSDI '17*, (Mar. 27, 2017).

Sol, D. et al., "Azure Image Builder overview", Microsoft. (Mar. 5, 2021).

Tost, A., et al., "Build and Extend Docker Container with Middleware Functions," IBM Developer, dated Aug. 2016.

Eikenberry, O., "How Enterprises Should Set Up an Infrastructure Delivery Pipeline", Liatrio, (Mar. 7, 2019).

"Virtual Machines as Code", NetFoundry, (Nov. 14, 2018).

"Best practices for writing Dockerfiles," DockerDocs, date found via Internet Archive as Feb. 3, 2022, URL: https://docs.docker.com/develop/develop-images/dockerfile_best-practices/.

Kapelonis, K., "Docker anti-patterns," CodeFresh, dated Jun. 7, 2019, URL: https://codefresh.io/containers/docker-anti-patterns/.

Kalra, S., et al., "Azure Image Builder overview," Microsoft, dated Jan. 14, 2022, URL: https://docs.microsoft.com/en-us/azure/virtual-machines/image-builder-overview.

"Build an Image," HashiCorp, date found via Internet Archive as May 18, 2021, URL: https://learn.hashicorp.com/tutorials/packer/docker-get-started-build-image?in=packer/docker-get-started.

* cited by examiner

3B00

STATE-DRIVEN VIRTUALIZATION SYSTEM IMAGING

TECHNICAL FIELD

This disclosure relates to dynamic configuration of computing cluster software, and more particularly to techniques for state-driven virtualization system imaging.

BACKGROUND

When performing imaging (e.g., an image installation onto a computing node), prior approaches view the imaging/install as a "monolithic" single step operation or as a series of large/coarse operations to be performed. In this regime, if an operation fails or some other problem occurs during imaging, then there will be a large amount of work to retry, the amount of work to retry being commensurate with the size of the step or steps that failed. In some cases the failed monolithic single step or the several failed large/coarse steps would need to be retried in order to complete generation of the installation image. This situation becomes more and more complicated with the advent of virtualized clusters that have thousands or millions of configuration possibilities. In such situations, the amount of potential and actual rework needed to generate a virtualization system image for a computing cluster grows inexorably larger and larger.

One approach to reduce the amount of potential and actual rework is to specify only small, idempotent operations when performing imaging, and combine these small idempotent operations into larger idempotent operations. This approach avoids rework as compared with redoing a large "monolithic" single step operation, however this approach may still lead to significant overhead, as each operation still needs to be retried, even if it does not need to be redone. Moreover, each larger idempotent operation must still invoke processing to leave the system in a recoverable state such that a retry can be performed should a smaller idempotent operation fail. This in turn can place a seemingly limitless burden on system administrators and/or technical staff, who may be required to troubleshoot and resolve such failures, and/or wait for long periods of time for idempotent operations to be retried—even though many of those operations do not actually need to be retried/redone.

Unfortunately, for at least the foregoing reasons, legacy techniques for generating a virtualization system image for a computing cluster are so inefficient that they have become impracticable for one reason or another. Therefore, what is needed is a technique or techniques that address the aforementioned deficiencies.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for state-driven virtualization system imaging, which techniques advance the relevant technologies to address technological issues with legacy approaches. More specifically, the present disclosure describes techniques used in systems, methods, and in computer program products for generating a virtualization system image using decomposed idempotent operations. Certain embodiments are directed to technological solutions for decomposing the imaging process into a series of retriable idempotent steps.

The disclosed embodiments modify and improve over legacy approaches. In particular, the herein-disclosed techniques provide technical solutions that address the technical problems attendant to eliminating the need to codify specific error handling for a myriad of possible error conditions that could occur during virtualization system imaging. Such technical solutions involve specific implementations (i.e., data organization, data communication paths, module-to-module interrelationships, etc.) that relate to the software arts for improving computer functionality. Various applications of the herein-disclosed improvements in computer functionality serve to reduce demands for computer memory, reduce demands for computer processing power, reduce network bandwidth usage, and reduce demands for intercomponent communication. For example, when performing computer operations that address the various technical problems underlying how to eliminate the need to codify specific error handling for a myriad of possible error conditions that could occur during virtualization system imaging, both memory usage and CPU cycles demanded are significantly reduced as compared to the memory usage and CPU cycles that would be needed but for practice of the herein-disclosed techniques.

The ordered combination of steps of the embodiments serve in the context of practical applications that perform steps for decomposing the imaging process into a series of retriable idempotent steps. These techniques for decomposing the imaging process into a series of retriable idempotent steps overcome long standing yet heretofore unsolved technological problems associated with eliminating the need to codify specific error handling for a myriad of possible error conditions that could occur during virtualization system imaging.

Many of the herein-disclosed embodiments for decomposing the imaging process into a series of retriable idempotent steps are technological solutions pertaining to technological problems that arise in the hardware and software arts that underlie configuring computing clusters. Aspects of the present disclosure achieve performance and other improvements in peripheral technical fields including, but not limited to, hyperconverged computing platform management and automated computing cluster assembly.

Some embodiments include a sequence of instructions that are stored on a non-transitory computer readable medium. Such a sequence of instructions, when stored in memory and executed by one or more processors, cause the one or more processors to perform a set of acts for decomposing the imaging process into a series of retriable idempotent steps.

Some embodiments include the aforementioned sequence of instructions that are stored in a memory, which memory is interfaced to one or more processors such that the one or more processors can execute the sequence of instructions to cause the one or more processors to implement acts for decomposing the imaging process into a series of retriable idempotent steps.

In various embodiments, any combinations of any of the above can be combined to perform any variations of acts for generating a virtualization system image using idempotent operations, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
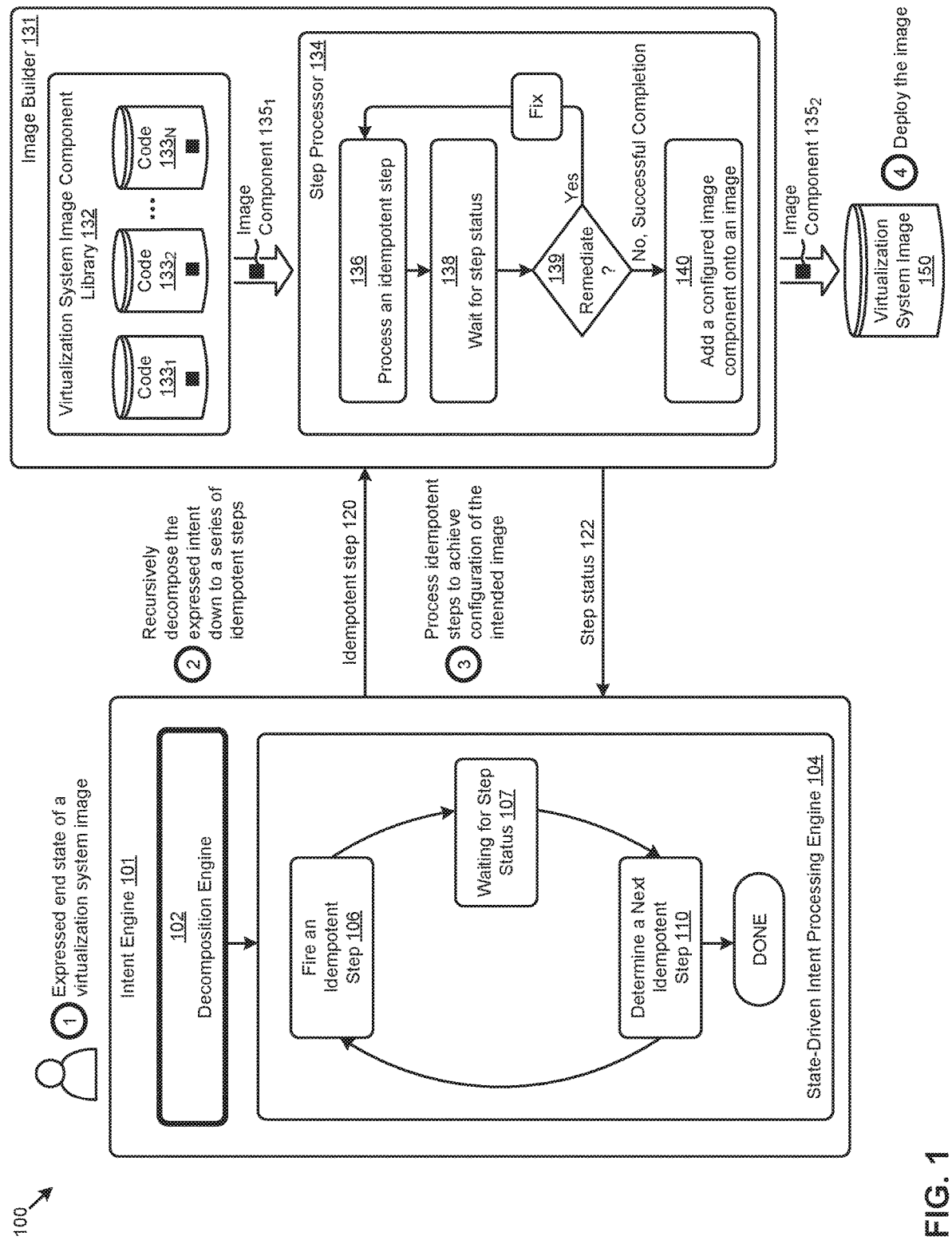
FIG. 1 depicts an example system for generating a virtualization system image using idempotent operations, according to an embodiment.

Aspects of the present disclosure serve to reduce or eliminate the need to codify specific error handling for a myriad of possible error conditions that could occur during virtualization system imaging. These problems are unique to, and may have been created by, various computer-implemented methods for generating virtualization system images in the context of configuring computing clusters. The accompanying figures and discussions herein present example environments, systems, methods, and computer program products that are directed to approaches for decomposing the imaging process into a series of retriable idempotent steps.

Overview

Rather than risk consuming large amounts of time and computing resources that might be expended in the event of a problem being detected during the course of a coarse-step imaging process, the herein-disclosed techniques employ a combination of (a) an intent engine that accepts an overall expressed intent to achieve an intended/desired state (e.g., completion of an imaging process), and (b) a mechanism to decompose the overall expressed intent into many smaller constituent intents that are in turn achievable through a series of smaller idempotent operations.

More specifically, in the event of a problem being detected during the performance of the imaging process, rather than redoing a large monolithic operation (e.g., restarting the installation from the beginning) or rather than redoing one or several large/coarse steps, instead, only small idempotent operations are redone to advance progress toward the expressed intent. As such, even in the case of recurring problems during imaging, those specific idempotent operations that have failed can be retried repeatedly until success for all of these idempotent operations has been achieved.

As can be understood, the smaller the idempotent operation, the less rework is needed to remediate a failed idempotent step. Accordingly, the techniques disclosed herein serve to recursively decompose the overall expressed intent into successively smaller and smaller constituent intents that are, in turn, achievable through a series of smaller idempotent operations. The recursion involved in the decomposition can continue to any prescribed lowest level. As one example, an expressed intent can be decomposed into a plurality of subordinate intents, and the resulting plurality of subordinate intents can be further decomposed into still smaller subordinate intents and then, each of the still smaller subordinate intents can be decomposed into corresponding one or more idempotent operations. When the recursion reaches a lowest level (i.e., where no further decomposition is called for), then executing the idempotent operations is commenced. When all of the idempotent operations are deemed to have been successfully carried out, then the initial expressed intent (e.g., configure a virtualization system image) is deemed to have been achieved.

As used herein, a virtualization system image is a collection of software instructions that serve to abstract details of underlying hardware or software components. A virtualization system image may include a hypervisor and support for maintaining virtual machines.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or." That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 depicts an example system 100 for generating a virtualization system image using idempotent operations. As an option, one or more variations of example system 100 or any aspect thereof may be implemented in the context of the architecture and functionality of the embodiments described herein and/or in any environment.

As shown, a user expresses a desire (e.g., intent) for a particular virtualization system image to be built. Intent engine 101 receives the expressed desire and interacts with an image builder 131 that generates a virtualization system image that comports with the expressed desire. The user need only express a desired final state of the virtualization system image (operation 1). The intent engine recursively decomposes the expressed intent into a set of executable idempotent steps (operation 2). The executable idempotent steps are fired or otherwise communicated to the image builder 131 (operation 3). When all of the executable idempotent steps have been carried out by the image builder, a virtualization system image that comports with the expressed desire has been built and is in a condition to be deployed (operation 4).

The expressed desire can be in natural language, such as, "Deploy a virtualization system having a Linux guest OS, a hypervisor, and two IP network interfaces," or can be expressed in accordance with a high-order language expression such as, "GuestOS=Linux; GuestOSVersion=v5; Hypervisor=AOS; IPInterfaces=2". Such an expression can be parsed and decomposed into constituent expressions. Decomposition engine 102 serves to recursively decompose the expressed intent into lower level intents and then to decompose the lower level intents into a set of idempotent steps, which are then processed by state-driven intent processing engine 104. The state-driven intent processing engine 104 and step processor 134 cooperate with each other such that when the state-driven intent processing engine acts to fire an idempotent step (process 106), the step processor will process (at process 136) the incoming idempotent step 120 by accessing the shown virtualization system image component library 132 to locate an image component 1351 that corresponds to the particular incoming idempotent step. Subsequently, that image component (e.g., shown as image component 1352) is added to the virtualization system image 150.

Under certain scenarios, it can happen that a particular idempotent step might take some time to complete, or might be performed asynchronously. To handle such cases, process 138 waits for the status of a corresponding idempotent step. If the corresponding idempotent step had failed, or if it had timed out, or if decision 139 had identified that remediation is needed (e.g., a fix), then the "Yes" branch of decision 139 is taken and the idempotent step that has failed or the idempotent step that has time-out, or variation of the failed or timed-out idempotent step is again attempted (at process 136). Remediation can sometimes take place by merely reprocessing the idempotent step, or remediation can sometimes take place by reprocessing the idempotent step with a different parameter setting, etc. Additionally or alternatively, a different idempotent step or a different intent can be selected rather than continuing to process the failed idempotent step. In cases where a different intent is selected, that different intent can be decomposed into smaller intents and those smaller intents can be decomposed into still smaller intents, and so on down to a new set of idempotent operations. The new set of idempotent operations is considered to determine which of those idempotent operations or corresponding smaller intents are not currently satisfied, and then run the idempotent steps that correspond to those smaller intents. In this manner, real-time changes in the environment in which system 100 operates can be detected and remediated by real-time adaptation.

Returning to the discussion of decision 139, if the corresponding idempotent step had completed, or if decision 139 had identified that no remediation is needed, then the "No" branch of decision 139 is taken and the image component (e.g., shown as image component 1352) that corresponds to the successful idempotent step is added (at process 140) to the virtualization system image 150.

During the time that the step processor has been processing and/or remediating steps, the state-driven intent processing engine 104 had been waiting (process 107) to receive status from the step processor. When the status (e.g., step status 122) is received (e.g., at process 107), the state-driven intent processing engine will determine a next idempotent step 110 to send to the image builder. In some cases the next idempotent step is a resend of a previously-sent idempotent step. If there is no next idempotent step to send to the image builder, and if all idempotent steps that had been sent to the image builder have returned a corresponding step status 122, then the state-driven intent processing engine 104 moves to a DONE state.

Figure 2:
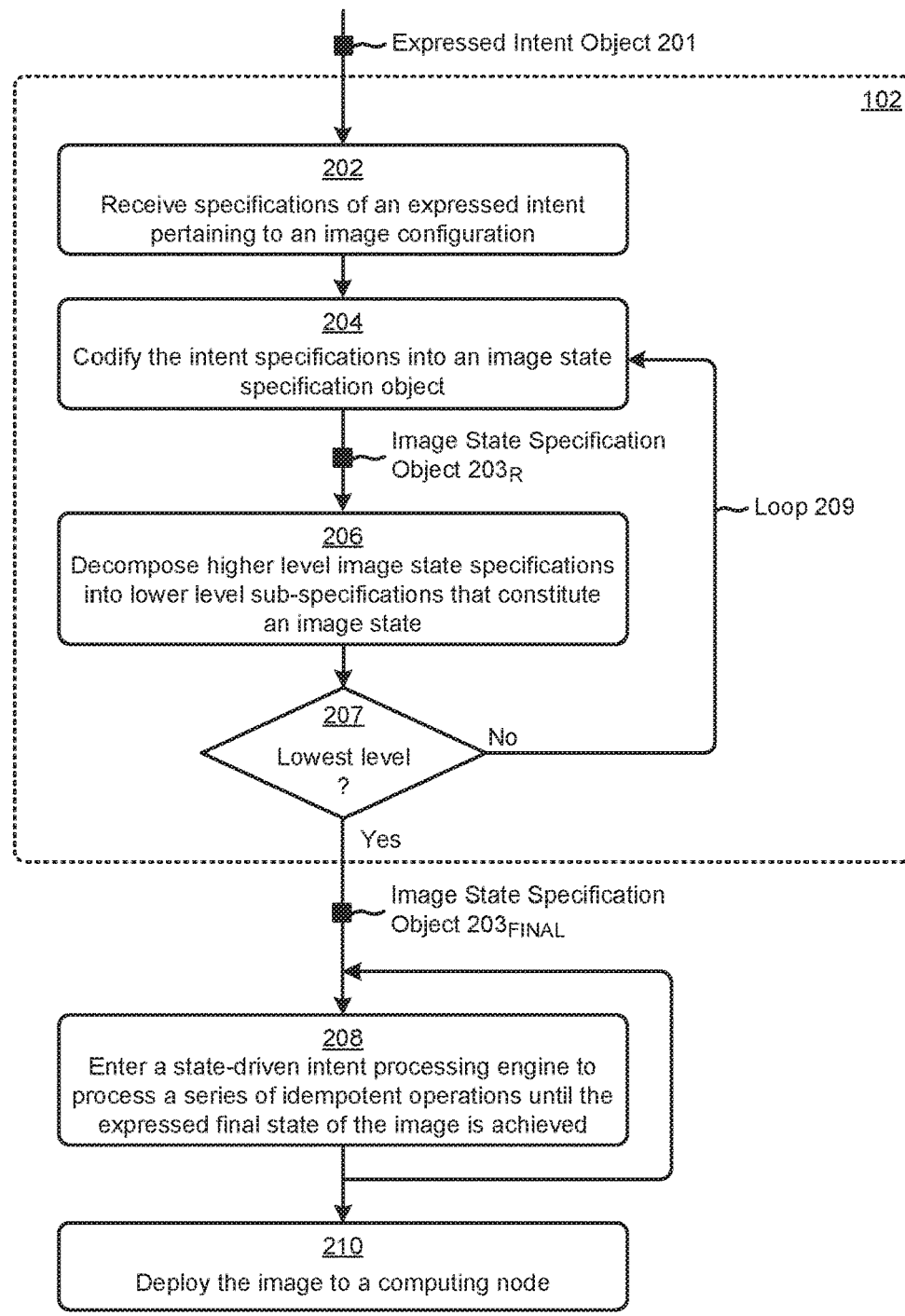
FIG. 2 presents a virtualization system imaging technique as used in systems that generate a virtualization system image using idempotent operations, according to an embodiment.

An example flow corresponding to the virtualization system imaging technique depicted in system 100 are shown and described as pertains to FIG. 2. In particular, the workings of the decomposition engine 102 of FIG. 1 are shown and described in detail as pertains FIG. 2.

FIG. 2 presents a virtualization system imaging technique 200 as used in systems that generate a virtualization system image using idempotent operations. As an option, one or more variations of virtualization system imaging technique 200 or any aspect thereof may be implemented in the context of the architecture and functionality of the embodiments described herein and/or in any environment.

The figure is being presented to illustrate how an expressed intent can be decomposed into lower level intents prior to entering a state-driven intent processing engine. More particularly, the figure is being presented to illustrate how an expressed end state of a virtualization image (e.g., as codified into expressed intent object 201) can be decomposed into a final image state specification (e.g., image state specification object $203_{FINAL}$) by progressing through a loop that decomposes image states into lower level image states.

As shown, step 202, step 204 and step 206 implement a state-driven intent processing engine. Step 202 is configured to receive an expressed intent object 201. Such an expressed intent object 201 may include one or more user-expressed intents (e.g., "Deploy a virtualization system having a Linux guest OS, a hypervisor, and two IP network interfaces"), or the content of intent object 201 can include one or more high-order language expressions (e.g., "GuestOS=Linux; GuestOSVersion=v5; Hypervisor=AOS; IPInterfaces=2"). Step 202 may perform pre-processing over the contents of the expressed intent object 201. For example, any natural language expressions might be converted to high-order language expressions, and any high-order language expressions might be formatted in a manner that is expected by step 204. An image state specification object $203_R$ is formed (at step 204), which image state specification object is processed in a recursive loop. Specifically, the loop serves to recursively (i.e., loop 209) pass through step 204 and step 206 so as to decompose the intents into successively smaller and smaller constituent intents that are in turn achievable through a series of smaller idempotent operations. The recursion involved in the decomposition can continue down to still smaller and smaller subordinate intents, which in turn can be decomposed into corresponding one or more idempotent operations. When the recursion reaches a lowest level (decision 207) such as where at least some of the intent specifications and at least some of the subordinate intents have been decomposed down to at least one idempotent operation, then execution of at least one idempotent operation is commenced. In some embodiments, decision 207 is configured such that idempotent operations are commenced only after all of the intent specifications and all of the subordinate intents have been decomposed down to corresponding idempotent operations.

In each cycle through the shown loop, the changes corresponding to decomposition of intent specifications and/or subordinate intents are recorded in an object that comprises decomposition changes. Step 204 is configured to be able to interpret such decomposition changes at successively lower and lower intent specifications. So long as there remain intent specifications and/or subordinate intents in image state specification object $203_R$, the "No" branch of decision 207 is taken and recursion continues.

At some pass through the loop, all of the intent specifications and/or subordinate expressed intents will have been decomposed (e.g., by step 206) into lowest level idempotent operations, and the "Yes" branch of decision 207 is taken. At this point the image state specification object $203_{FINAL}$ contains only idempotent operations which, at step 208, are provided to a state-driven intent processing engine. The foregoing idempotent operations are codified in a manner that is expected by the state-driven intent processing engine 104 of FIG. 1. The state-driven intent processing engine keeps track of the successes and/or retries of the idempotent operations. When all of such idempotent operations have been successfully executed, the original image specification as given in expressed intent object 201 will be deemed to be have been achieved.

Any known techniques can be used to execute the idempotent operations. In the specific example system of FIG. 1, the state-driven intent processing engine 104 cooperates with image builder 131 to build the image. This cooperation can continue (e.g., continuous processing within step 208) until such time as the expressed final state of the virtualization system image is achieved. Then, once the expressed final state of the virtualization system image is achieved, the image can be deployed to a computing node (step 210). In some cases, multiple expressed final states of multiple virtualization system images can be expressed such that multiple virtualization system images are built. As such, multiple virtualization system images can be deployed to multiple computing nodes that constitute a computing cluster.

Figure 3A:
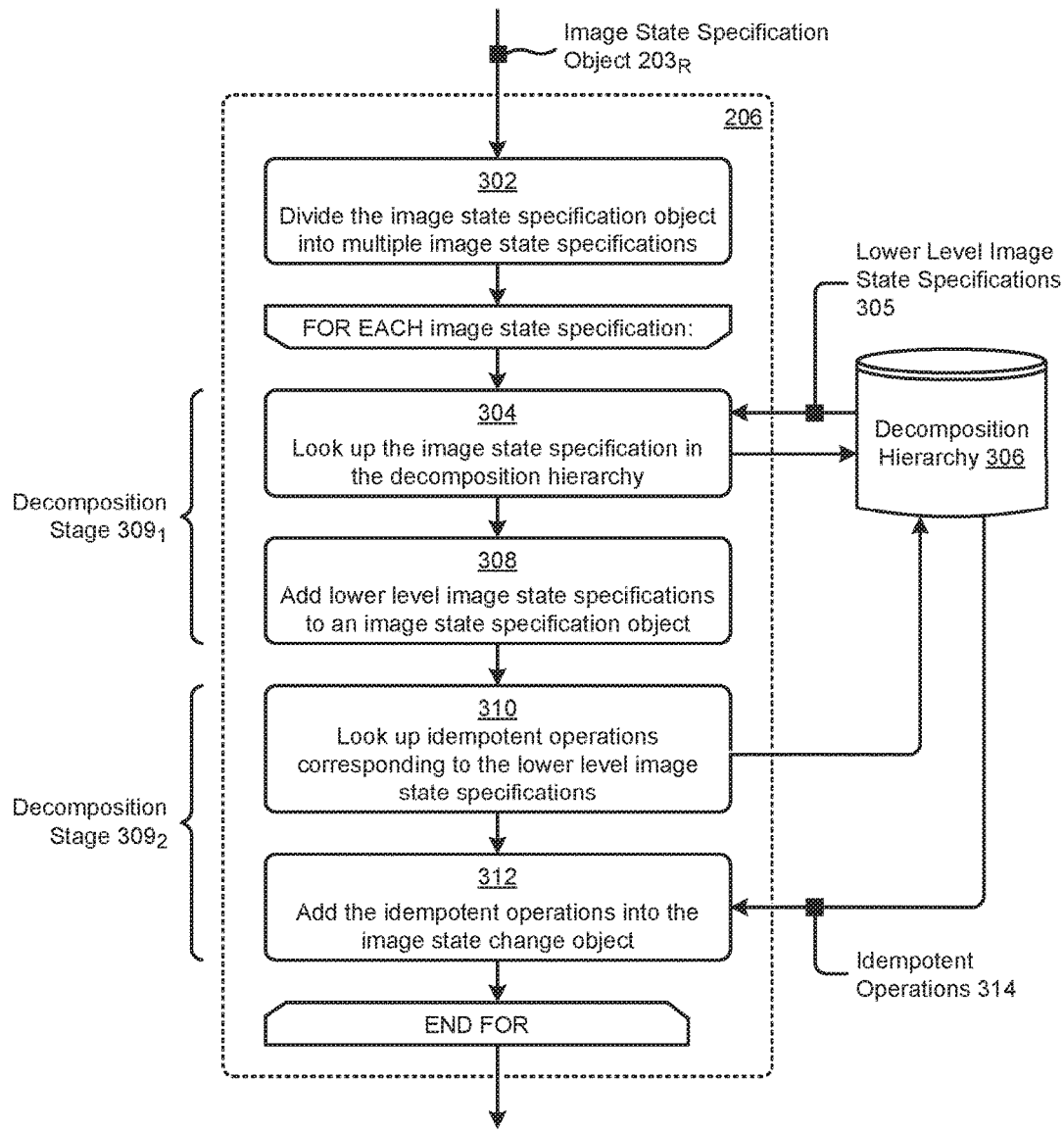
FIG. 3A shows a specification decomposition technique as used in systems that generate a virtualization system image using idempotent operations, according to an embodiment.

FIG. 3A shows a specification decomposition technique 3A00 as used in systems that generate a virtualization system image using idempotent operations. As an option, one or more variations of specification decomposition technique 3A00 or any aspect thereof may be implemented in the context of the architecture and functionality of the embodiments described herein and/or in any environment.

The figure is being presented to show how codified intents can be decomposed into lower level intents, and how lower level intents can be associated with executable instructions that correspond to idempotent operations. The example of FIG. 3A is merely one possible implementation of a technique to decompose higher level image state specifications into lower level sub-specifications. The shown flow may be implemented within a loop. In particular, and referring to the embodiment of FIG. 2, the shown flow serves as an implementation of step 206.

The flow operates on an image state specification object by dividing the image state specifications that constitute the image state specification object into multiple image states (step 302). The dividing operations may divide the image state specifications based on the level of the specification. In some cases, image state specifications are explicitly designated as corresponding to a particular level or, in some cases, the particular level of an image state specification may be implied by its manner of codification (e.g., where higher level image state specifications occur near the beginning of a list and lower level image state specifications occur near the end of the list).

The image state specifications can be processed in any order, however in some embodiments, higher level image state specifications are processed before lower level image state specifications. A loop processes each image state specification as follows: (1) decompose any higher level image state specifications into lower level image state specifications (decomposition stage $309_1$) by performing a lookup into a decomposition hierarchy, and (2) decompose any lower level image state specifications into idempotent operations (decomposition stage $309_2$). More specifically, for each iteration through the loop, step 304 serves to query or otherwise perform a look up operation over decomposition hierarchy 306 using the image state specification of the current iteration. Then, based on the result of the lookup of step 304, lower level image state specifications 305 are added to the image state specification object at step 308, possibly supplanting the image state specification of the current iteration. Also, for each iteration through the loop, step 310 serves to look up idempotent operations corresponding to the image state specification of the current iteration by accessing a decomposition hierarchy 306. Then, based on the result of the lookup, idempotent operations 314 are added to the image state specification object at step 312, possibly supplanting the image state specification of the current iteration.

When the flow competes its iterations, it returns to its caller, possibly to be re-entered in a subsequent invocation where, again, higher level image state specifications are decomposed into lower level image state specifications by performing lookups into decomposition hierarchy 306.

Figure 3B:
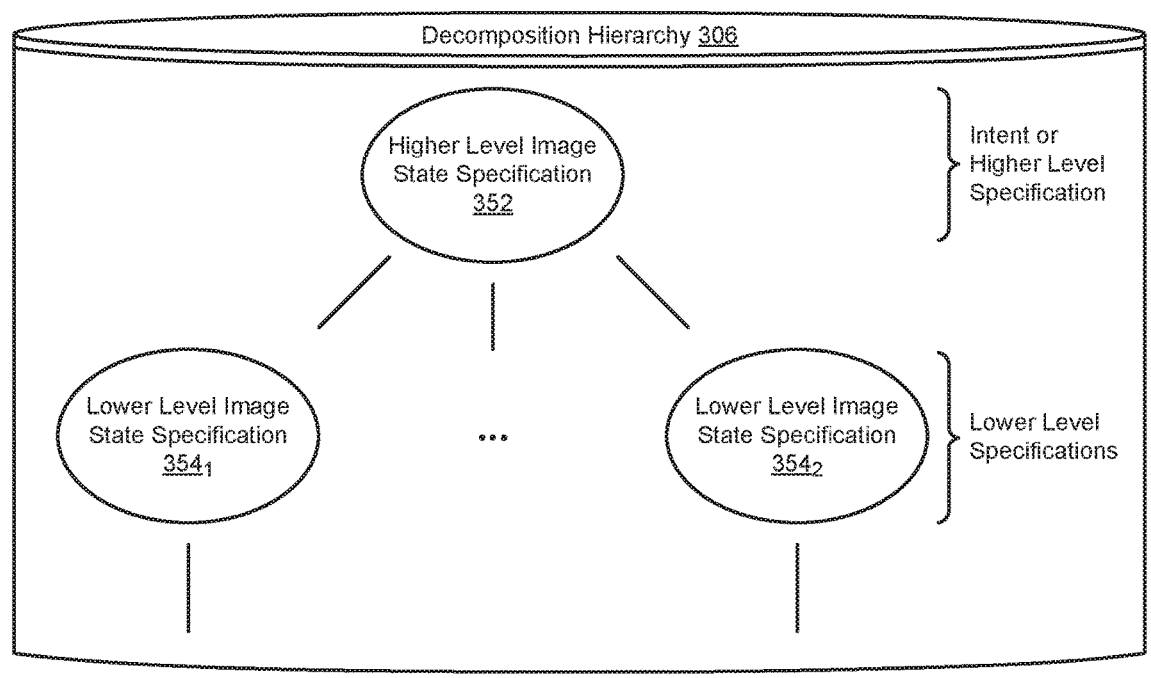
FIG. 3B shows an idempotent operation decomposition hierarchy, according to an embodiment.

FIG. 3B shows an idempotent operation decomposition hierarchy 3B00 as used in systems that generate a virtualization system image using idempotent operations. As an option, one or more variations of idempotent operation decomposition hierarchy 3B00 or any aspect thereof may be implemented in the context of the architecture and functionality of the embodiments described herein and/or in any environment.

As shown, an intent (e.g., a higher level image state specification 352) can be associated with one or more lower level specifications (e.g., lower level image state specification $354_1$, lower level image state specification $354_2$). The hierarchy continues downward in a manner such that any lower level image state specification can have one or more even still lower level image state specifications, and so on. The decomposition hierarchy can be embodied as a table or as a list of lists, or in any other data structure. The decomposition hierarchy can be query-able to return a lower level image state specification when given an intent or higher level image state specification. Alternatively or additionally, the decomposition hierarchy can be query-able to return a still lower level image state specification when given a lower level image state specification.

Figure 4:
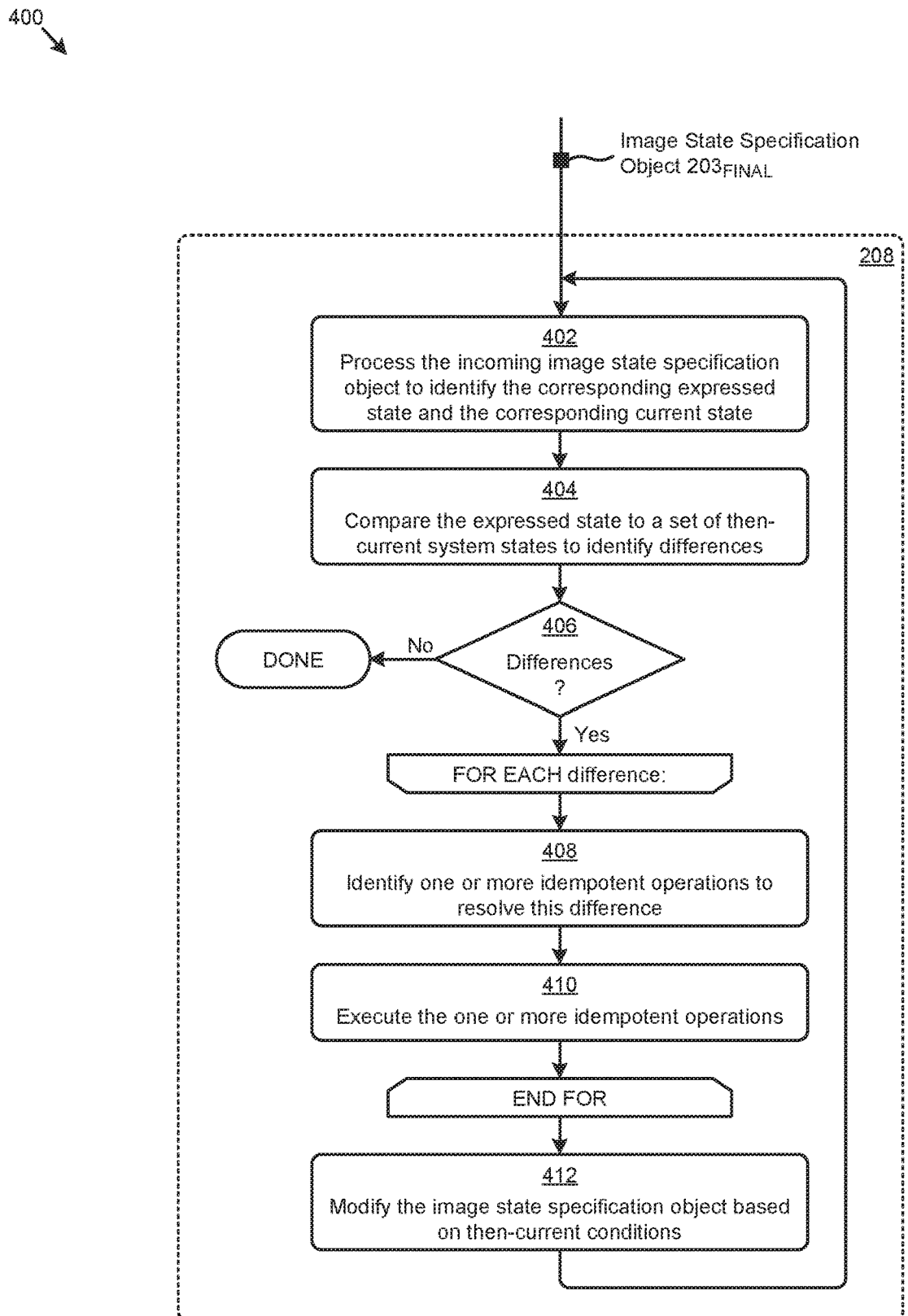
FIG. 4 shows a technique for processing idempotent operations as used in systems that generate a virtualization system image using idempotent operations, according to an embodiment.

FIG. 4 shows a technique 400 for processing idempotent operations as used in systems that generate a virtualization system image using idempotent operations. As an option, one or more variations of technique 400 or any aspect thereof may be implemented in the context of the architecture and functionality of the embodiments described herein and/or in any environment.

The figure is being presented to illustrate how a state-driven intent processing engine can process a series of idempotent operations to produce the expressed final state of the image. The virtualization system imaging state machine 400 is invoked when an image state specification object (e.g., the shown image state specification object $203_{FINAL}$) becomes available. At step 402, the incoming image state specification object is processed to identify any differences in any image states that do not match the then-current state of the virtualization system image being formed.

There can be differences for many reasons. One reason might be that an idempotent operation that was intended to be performed had not yet been performed. For example, if the idempotent operation was "assign IP address 192.168.3.4 to network interface eth0," and if the target virtualization system image does not yet have the IP address assigned to network interface eth0, then that idempotent operation would be fired. Another reason might be that the state of the virtualization system image had changed due to external factors (e.g., manual modifications performed by a user). Yet another reason might be that that an idempotent operation that was intended to be performed had failed. For example, if the idempotent operation was "download and install Node.js version 14.13," and if the previous invocation had failed (e.g., due to a network outage), then that idempotent operation would be fired again.

There can be many reasons or conditions that would cause a particular idempotent operation to fail. Rather than to attempting to codify specific error handling for a myriad of possible error conditions that could occur during virtualization system imaging, instead, the retriable idempotent operations that failed are retried. In some cases, a condition that had caused a particular idempotent operation to fail may have self-remediated (e.g., temporary outage of network facilities), or in some cases parameter settings that had caused a particular idempotent operation to fail can be changed and the idempotent operation can be retried. In still other cases, parameter settings that are merely hypothesized to have caused a particular idempotent operation to fail can be changed and the idempotent operation can be retried with the changed parameter settings.

As such, there can be many types of remediations. A particular remediation operation is selected based on the characteristics of the difference or differences between any image states as compared to the then-current states of the virtualization system image being formed. In the case that performance of step 404 to compare the expressed state to a set of then-current system states, does indeed identify differences, then when decision 406 is performed, processing will proceed down the "Yes" branch of decision 406.

For each difference, step 408 serves to identify idempotent operations that could resolve the difference or even just perform a retry in the face of changed or changing environmental conditions. Step 410 causes execution of the identified one or more operations.

In some situations a retried idempotent operation synchronously returns a status (e.g., a success status). In such situations step 412 serves to modify the image state specification object to reflect the then-current conditions. As one example, if a particular occurrence of idempotent operation "A" in the image state specification object had succeeded, then that occurrence can be deleted from the image state specification object and the flow loops back to the top. The flow repeats until such time as there are no more differences, at which point the "No" branch of decision 406 is taken.

As mentioned in the foregoing, a particular remediation operation can be selected based on the characteristics of the difference or differences between any image states as compared to then-current states of the virtualization system image being formed. In certain scenarios and for certain remediations, the actions of any particular remediation operation can be conveniently expressed in executable code. In this scenario, what is needed is a way to map the actions of any particular remediation to such corresponding code. One possible implementation of mapping the actions of a particular remediation to its corresponding executable code is given as pertains to FIG. 5A.

Figure 5A:
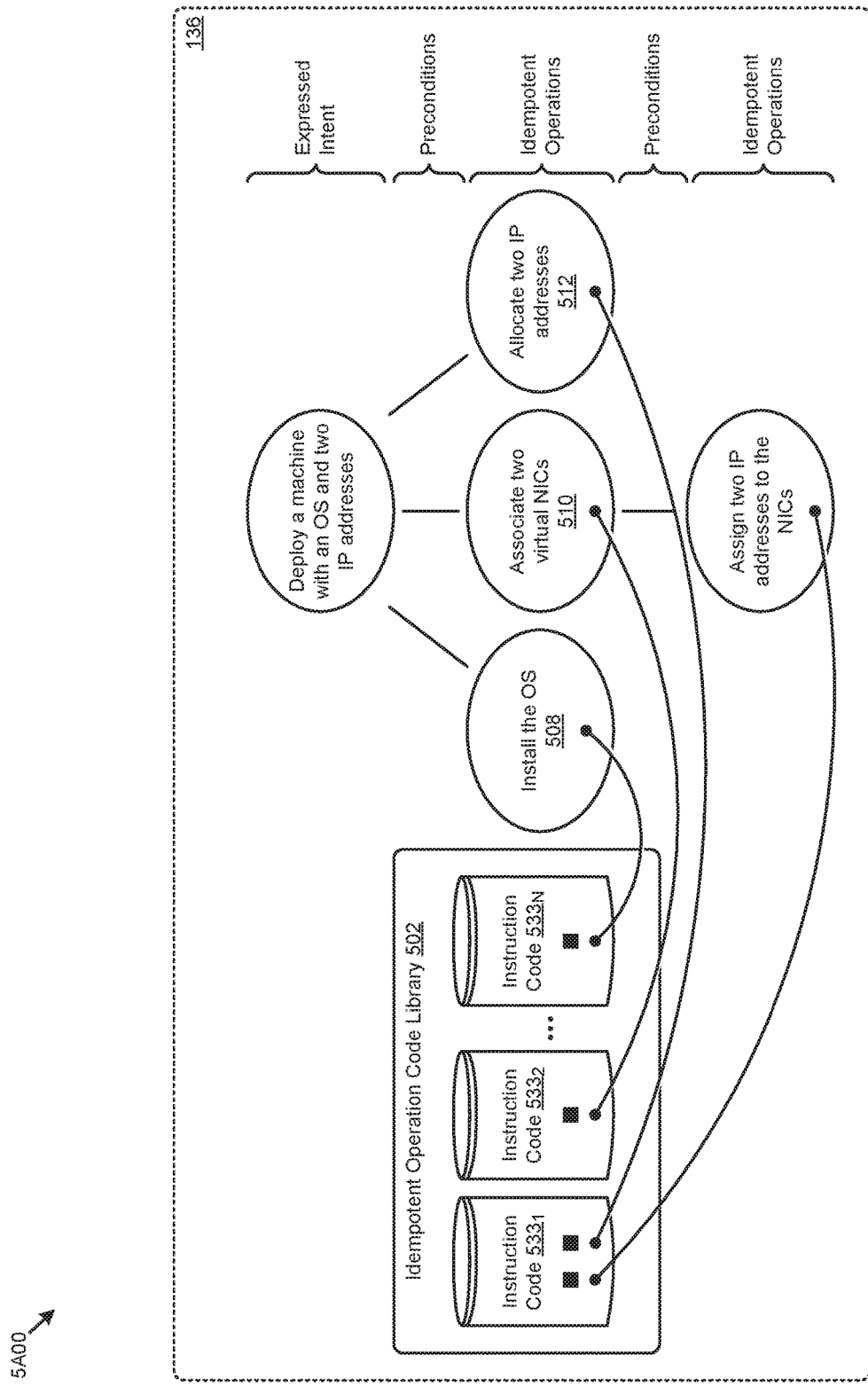
FIG. 5A shows operation-to-code mapping technique as used in systems that generate a virtualization system image based on recursive decomposition of intent specifications, according to an embodiment.

FIG. 5A shows operation-to-code mapping technique 5A00 as used in systems that generate a virtualization system image based on recursive decomposition of intent specifications. As an option, one or more variations of operation-to-code mapping technique 5A00 or any aspect thereof may be implemented in the context of the architecture and functionality of the embodiments described herein and/or in any environment.

The figure is being presented to illustrate how a sub-specification can be decomposed into executable instructions, and how a virtualization system image can be constructed from selected executable code drawn from a virtualization system image component library.

Specifically, and as shown, a particular idempotent operation corresponding to a particular sub-specification can be mapped to executable code (e.g., instructions code $533_1$, instructions code $533_2$, instructions code $533_N$) drawn from an idempotent operation code library 502. The selected executable code drawn from the library can include a call to an API, or can include a routine or a function or a method, or a script, etc. In fact, any known technique can be used to codify how the particular idempotent operation is to be carried out. Strictly as examples, the idempotent operation to install the OS 508 can be mapped to an API call of the form "INSTALL_OS(targetURL, "/bin/linuxV5.bin"), the idempotent operation to allocate two virtual IP addresses 512 can be mapped to an API call of the form "AllocateIPsFromPool (count=2)", and idempotent operation to associate two virtual NICs 510 can be mapped to two API calls of the form "Associate_vNIC(/dev/virtual/vNIC1, allocatedIP1)" and "Associate vNIC(/dev/virtual/vNIC2, allocatedIP2)".

Figure 5B:
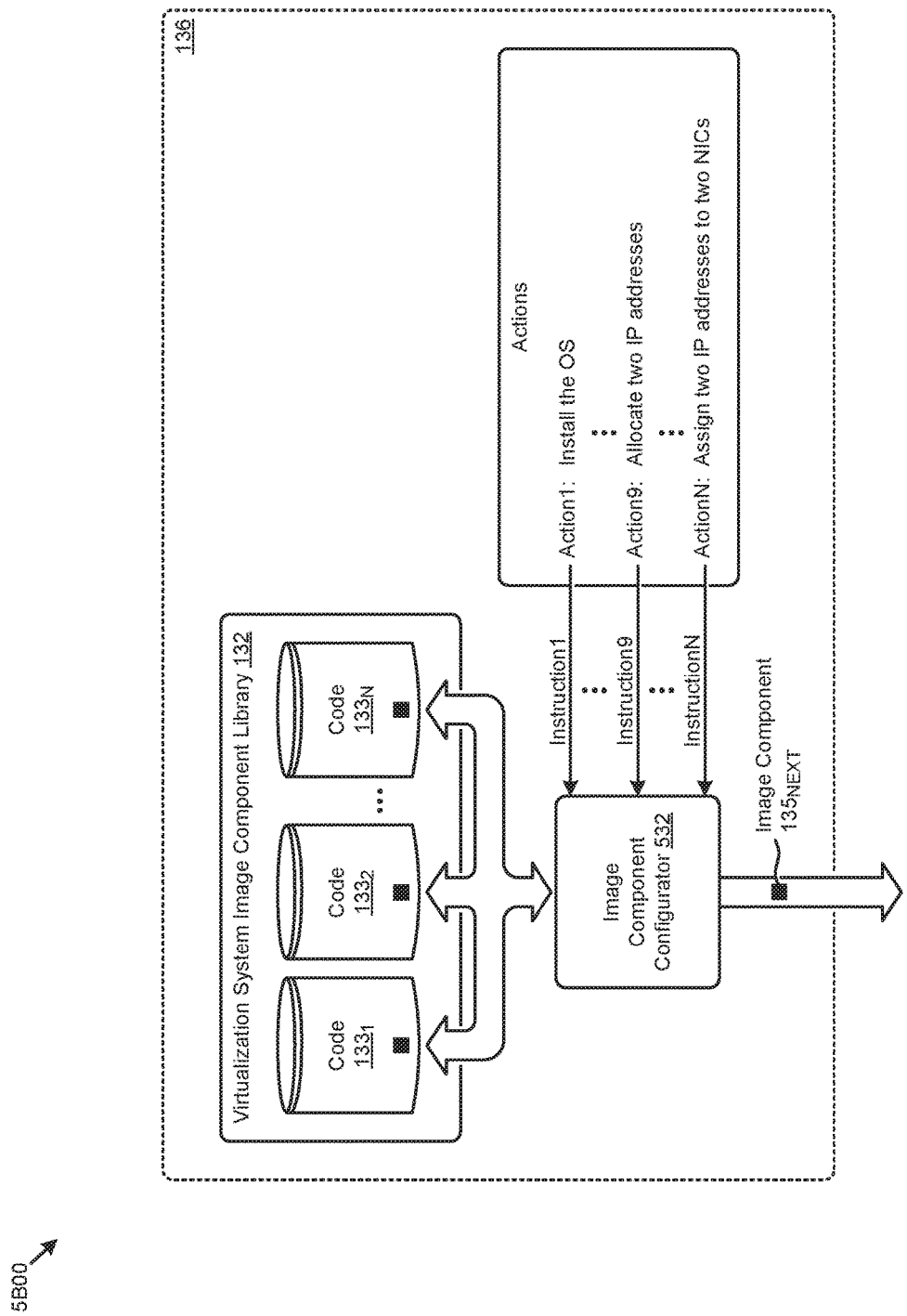
FIG. 5B shows action-to-code mapping technique as used in systems that generate a virtualization system image based on recursive decomposition of intent specifications, according to an embodiment.

FIG. 5B shows action-to-code mapping technique 5B00 as used in systems that generate a virtualization system image based on recursive decomposition of intent specifications, according to an embodiment. As an option, one or more variations of operation-to-code mapping technique 5B00 or any aspect thereof may be implemented in the context of the architecture and functionality of the embodiments described herein and/or in any environment.

The figure is being presented to show how code that comprises a to-be-configured virtualization system image can be drawn from a component library. Specifically, any action (e.g., action1, action9, actionN) can correspond to an instruction (e.g., instruction1, instruction9, instructionN) which in turn causes an image component configurator 532 to draw executable modules (e.g., code $133_1$, code $133_2$, code $133_N$) from a virtualization system image component library 132. Based on successive incoming instructions (e.g., instruction1, instruction9, instructionN), the shown image component configurator 532 outputs successive image components (e.g., image component $135_{NEXT}$). The image components are assembled into a virtualization system image (e.g., virtualization system image 150 of FIG. 1) in preparation for deployment.

Figure 6:
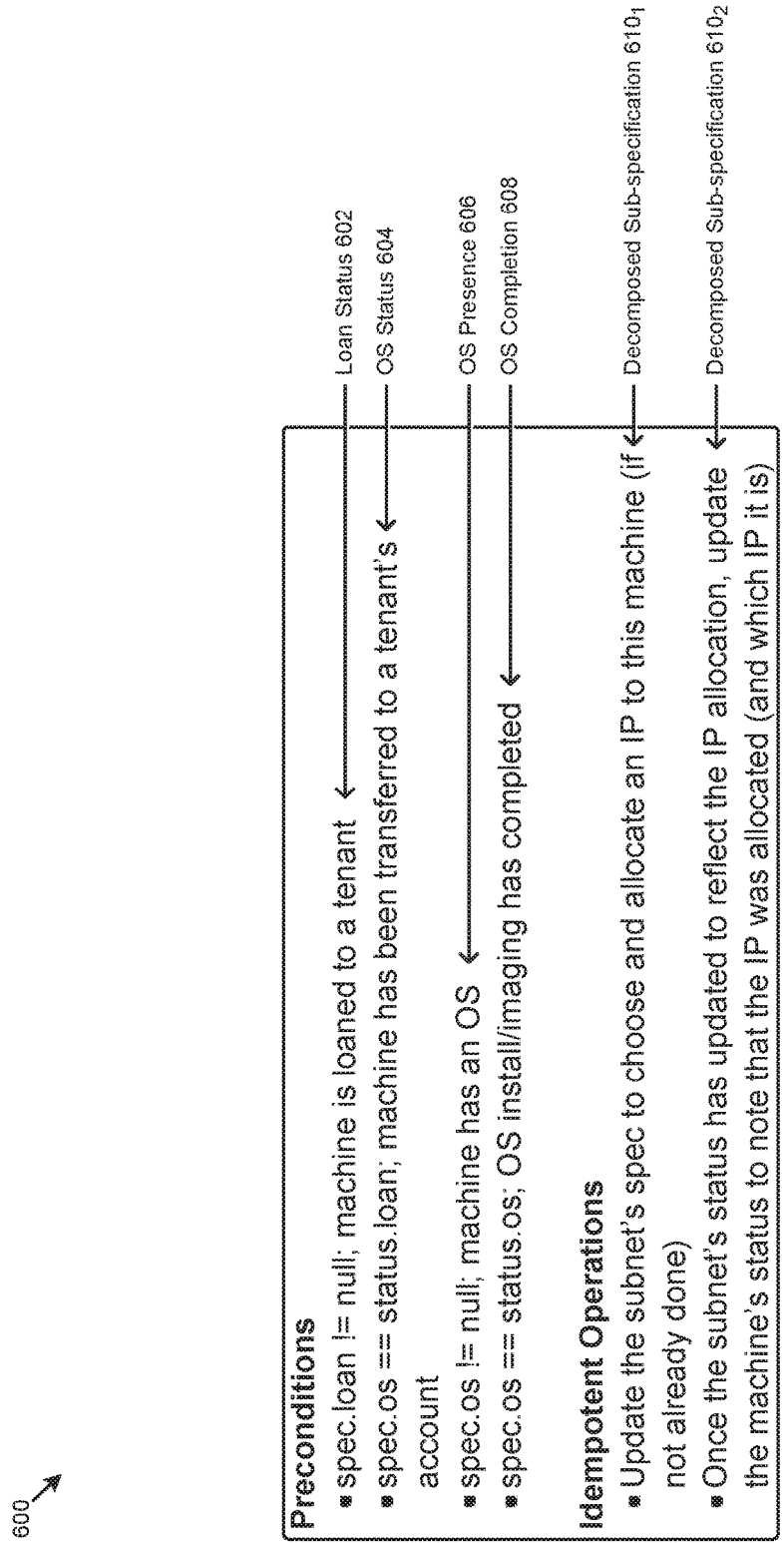
FIG. 6 shows a state-to-action codification technique as used in systems that generate a virtualization system image based on recursive decomposition of intent specifications, according to an embodiment.

FIG. 6 shows a state-to-action codification technique 600 as used in systems that generate a virtualization system image based on recursive decomposition of intent specifications. As an option, one or more variations of state-to-action codification 600 or any aspect thereof may be implemented in the context of the architecture and functionality of the embodiments described herein and/or in any environment.

The figure is being presented to show one possible embodiment of how a set of conditions can lead to corresponding operations. In the example shown, a meta-language is used to specify the semantics of a condition. Strictly for illustrative purposes the example corresponds to a situation in a public cloud that hosts servers for multiple tenants. The illustrative example includes a Boolean operation to test for loan status 602, a Boolean expression to test for loan status 604, a Boolean expression to test for OS installation status 606 and a Boolean expression to test for an imaging completed status 608.

When the Boolean expressions corresponding to a set of preconditions are satisfied (e.g., all evaluate to Boolean TRUE), then execution of the specified idempotent operations can commence. An example set of specified idempotent operations is shown by decomposed sub-specification 6101, and decomposed sub-specification 6102. In some cases there is only one idempotent operation that corresponds to a single particular precondition. In such a case, the given one of the idempotent operations is executed after the single precondition corresponding to the given one of the idempotent operations is satisfied.

System Architecture Overview

All or portions of any of the foregoing techniques can be partitioned into one or more modules and instanced within, or as, or in conjunction with a virtualized controller in a virtual computing environment. Some example instances within various virtual computing environments are shown and discussed as pertains to FIG. 7A, FIG. 7B, FIG. 7C, and FIG. 7D.

Figure 7A:
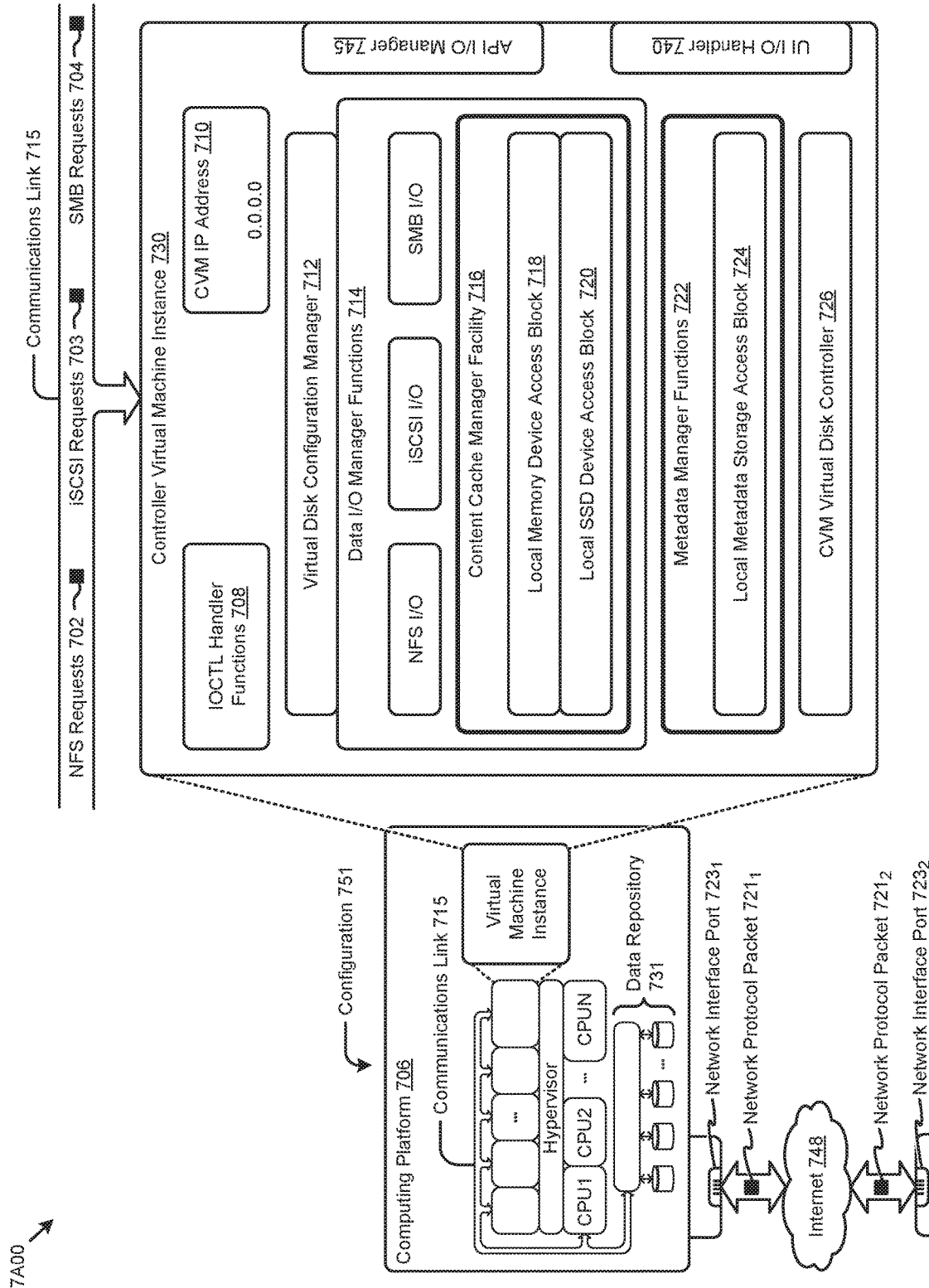
FIG. 7A, FIG. 7B, FIG. 7C, and FIG. 7D depict virtualization system architectures comprising collections of interconnected components suitable for implementing embodiments of the present disclosure and/or for use in the herein-described environments.

FIG. 7A depicts a virtualized controller as implemented in the shown virtual machine architecture 7A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 730.

In this and other configurations, a controller virtual machine instance receives block I/O storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output can be handled by one or more IO control handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS TO, iSCSI TO, SMB TO, etc.).

In addition to block IO functions, configuration 751 supports IO of any form (e.g., block TO, streaming TO, packet-based TO, HTTP traffic, etc.) through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). Configuration 751 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

Computing platform 706 may transmit and receive messages that can be composed of configuration data and/or any other forms of data and/or instructions organized into a data structure (e.g., communications packets). In some cases, the data structure includes program instructions (e.g., application code) communicated through the Internet 748 and/or through any one or more instances of communications link 715. Received program instructions may be processed and/or executed by a CPU as it is received and/or program instructions may be stored in any volatile or non-volatile storage for later execution. Program instructions can be transmitted via an upload (e.g., an upload from an access device over the Internet 748 to computing platform 706). Further, program instructions and/or the results of executing program instructions can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/ or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to generating a virtualization system image using idempotent operations. In some embodiments, a module may include one or more state machines and/or combinational logic used to implement or facilitate the operational and/or performance characteristics pertaining to generating a virtualization system image using idempotent operations.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of generating a virtualization system image using idempotent operations). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to generating a virtualization system image using idempotent operations, and/or for improving the way data is manipulated when performing computerized operations pertaining to decomposing the imaging process into a series of retriable idempotent steps.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT," issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT," issued on Oct. 1, 2013, which is hereby incorporated by reference in its entirety.

Figure 7B:
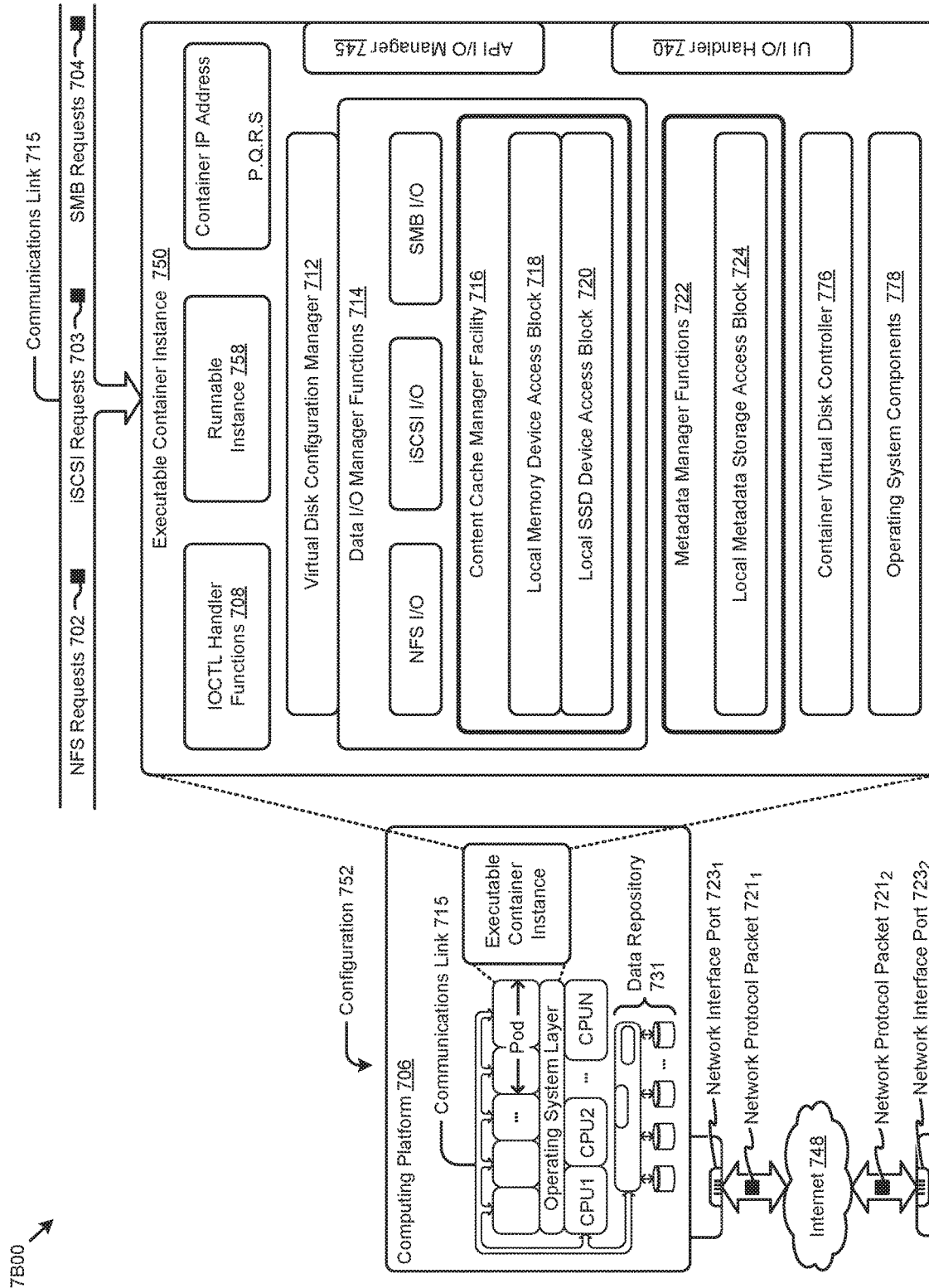

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors (e.g., user virtual machines or other processes) via an IP address (e.g., "P.Q.R.S," as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a," etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
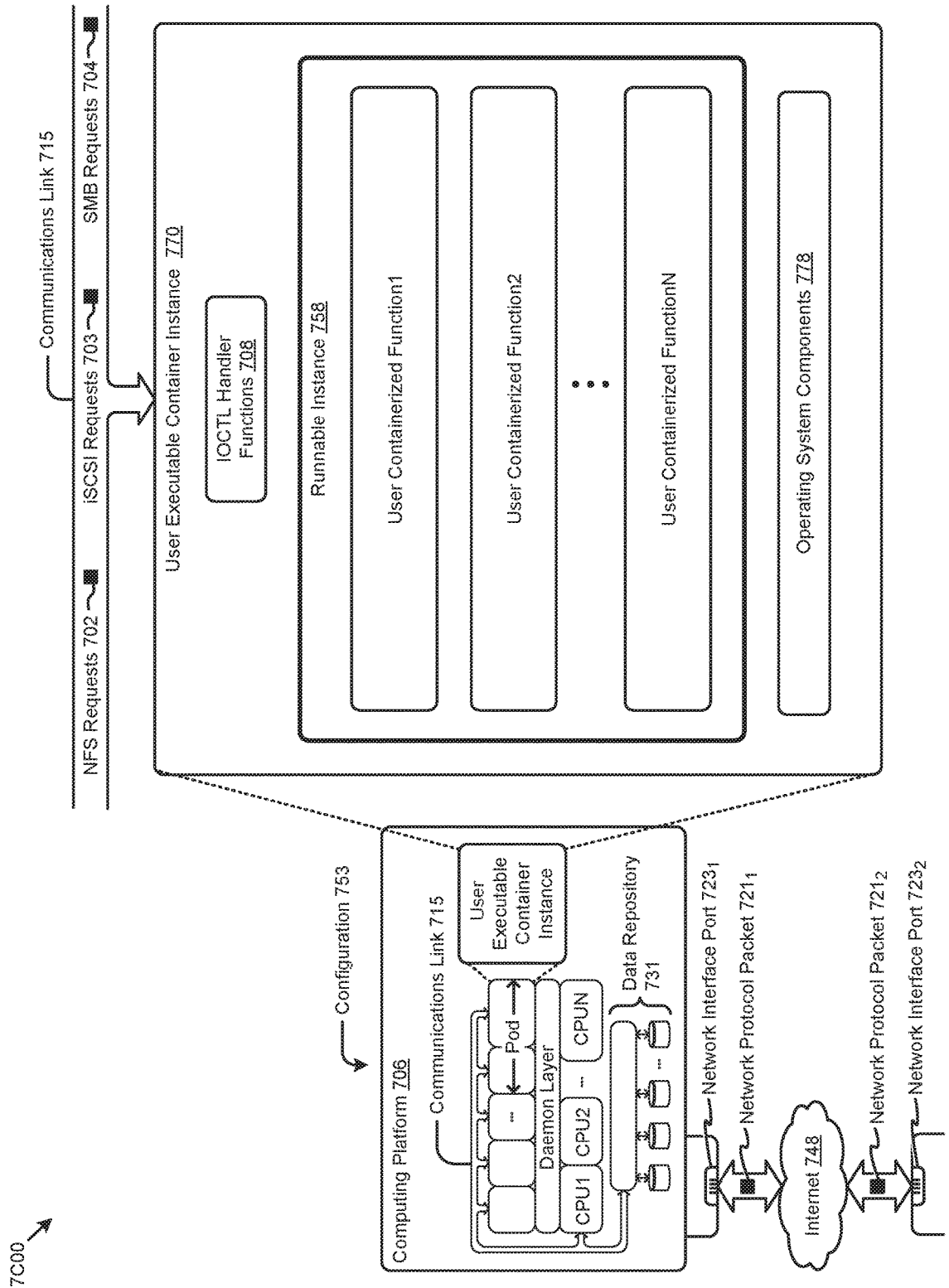

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 770. Configuration 753 includes a daemon layer (as shown) that performs certain functions of an operating system.

User executable container instance 770 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 770.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM," or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 7D:
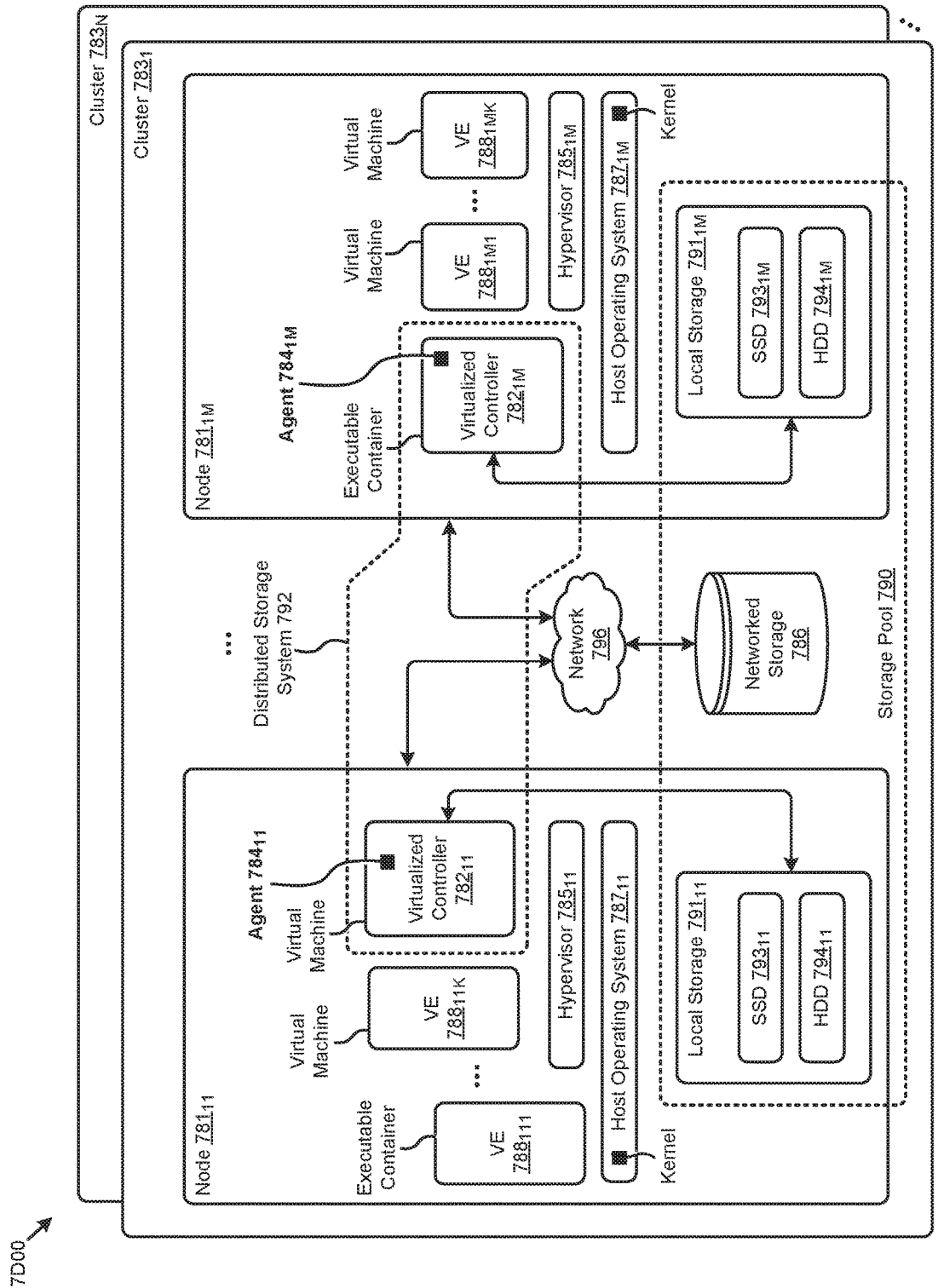

FIG. 7D depicts a distributed virtualization system in a multi-cluster environment 7D00. The shown distributed virtualization system is configured to be used to implement the herein disclosed techniques. Specifically, the distributed virtualization system of FIG. 7D comprises multiple clusters (e.g., cluster $783_1$, . . . , cluster $783_N$) comprising multiple nodes that have multiple tiers of storage in a storage pool. Representative nodes (e.g., node $781_{11}$, . . . , node $781_{1M}$) and storage pool 790 associated with cluster $783_1$ are shown. Each node can be associated with one server, multiple servers, or portions of a server. The nodes can be associated (e.g., logically and/or physically) with the clusters. As shown, the multiple tiers of storage include storage that is accessible through a network 796, such as a networked storage 786 (e.g., a storage area network or SAN, network attached storage or NAS, etc.). The multiple tiers of storage further include instances of local storage (e.g., local storage $791_{11}$, . . . , local storage $791_{1M}$). For example, the local storage can be within or directly attached to a server and/or appliance associated with the nodes. Such local storage can include solid state drives (SSD $793_{11}$, . . . , SSD $793_{1M}$), hard disk drives (HDD $794_{11}$, HDD $794_{1M}$), and/or other storage devices.

As shown, any of the nodes of the distributed virtualization system can implement one or more user virtualized entities (e.g., VE $788_{111}$, . . . , VE $788_{11K}$, . . . , VE $788_{1M1}$, . . . , VE $788_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $787_{11}$, . . . , host operating system $787_{1M}$), while the VMs run multiple applications on various respective guest operating systems. Such flexibility can be facilitated at least in part by a hypervisor (e.g., hypervisor $785_{11}$, . . . , hypervisor $785_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $787_{11}$, . . . , host operating system $787_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 790 by the VMs and/or the executable containers.

Multiple instances of such virtualized controllers can coordinate within a cluster to form the distributed storage system 792 which can, among other operations, manage the storage pool 790. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $781_{11}$ can interface with a controller virtual machine (e.g., virtualized controller $782_{11}$) through hypervisor $785_{11}$ to access data of storage pool 790. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 792. For example, a hypervisor at one node in the distributed storage system 792 might correspond to software from a first vendor, and a hypervisor at another node in the distributed storage system 792 might correspond to a second software vendor. As another virtualized controller implementation example, executable containers can be used to implement a virtualized controller (e.g., virtualized controller $782_{1M}$) in an operating system virtualization environment at a given node. In this case, for example, the virtualized entities at node $781_{1M}$ can access the storage pool 790 by interfacing with a controller container (e.g., virtualized controller $782_{1M}$) through hypervisor $785_{1M}$ and/or the kernel of host operating system $787_{1M}$.

In certain embodiments, one or more instances of an agent can be implemented in the distributed storage system 792 to facilitate the herein disclosed techniques. Specifically, agent $784_{11}$ can be implemented in the virtualized controller $782_{11}$, and agent $784_{1M}$ can be implemented in the virtualized controller $782_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to decomposing the imaging process into a series of retriable idempotent steps can be brought to bear through implementation of any one or more of the foregoing embodiments. Moreover, any aspect or aspects pertaining to eliminating the need to codify specific error handling for a myriad of possible error conditions that could occur during virtualization system imaging can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts for forming a virtualization system image, the acts comprising:
    receiving a specification of an expressed end state of the virtualization system image;
    decomposing the specification into idempotent operations; and
    generating the virtualization system image by processing the idempotent operations.

2. The non-transitory computer readable medium of claim 1, wherein the specification of the expressed end state is decomposed by decomposing the expressed end state into a lower level intent.

3. The non-transitory computer readable medium of claim 2, wherein the expressed end state and the lower level intent are codified in a decomposition hierarchy.

4. The non-transitory computer readable medium of claim 2, wherein the lower level intent is decomposed into at least one idempotent operation by accessing a decomposition hierarchy with a query comprising at least the lower level intent.

5. The non-transitory computer readable medium of claim 1, further comprising instructions which, when stored in memory and executed by the processor cause the processor to perform further acts of accessing an idempotent operation code library to retrieve executable instructions corresponding to the idempotent operations.

6. The non-transitory computer readable medium of claim 5, wherein a given one of the idempotent operations is executed after a precondition corresponding to the given one of the idempotent operations is satisfied.

7. The non-transitory computer readable medium of claim 1, wherein the virtualization system image is constructed from selected executable code drawn from a virtualization system image component library.

8. The non-transitory computer readable medium of claim 7 wherein the selected executable code is determined based at least in part on a status of at least one of the idempotent operations.

9. A method for forming a virtualization system image, the method comprising:
    receiving a specification of an expressed end state of the virtualization system image;
    decomposing the specification into idempotent operations; and
    generating the virtualization system image by processing the idempotent operations.

10. The method of claim 9, wherein the specification of the expressed end state is decomposed by decomposing the expressed end state into a lower level intent.

11. The method of claim 10, wherein the expressed end state and the lower level intent are codified in a decomposition hierarchy.

12. The method of claim 10, wherein the lower level intent is decomposed into at least one idempotent operation by accessing a decomposition hierarchy with a query comprising at least the lower level intent.

13. The method of claim 9, further comprising accessing an idempotent operation code library to retrieve executable instructions corresponding to the idempotent operations.

14. The method of claim 13, wherein a given one of the idempotent operations is executed after a precondition corresponding to the given one of the idempotent operations is satisfied.

15. The method of claim 9, wherein the virtualization system image is constructed from selected executable code drawn from a virtualization system image component library.

16. The method of claim 15 wherein the selected executable code is determined based at least in part on a status of at least one of the idempotent operations.

17. A system for forming a virtualization system image, the system comprising:
    a storage medium having stored thereon a sequence of instructions; and
    a processor that executes the sequence of instructions to cause the processor to perform acts comprising,
        receiving a specification of an expressed end state of the virtualization system image;
        decomposing the specification into idempotent operations; and
        generating the virtualization system image by processing the idempotent operations.

18. The system of claim 17, wherein the specification of the expressed end state is decomposed by decomposing the expressed end state into a lower level intent.

19. The system of claim 18, wherein the expressed end state and the lower level intent are codified in a decomposition hierarchy.

20. The system of claim 18, wherein the lower level intent is decomposed into at least one idempotent operation by accessing a decomposition hierarchy with a query comprising at least the lower level intent.

21. The system of claim 17, further comprising instructions which, when stored in memory and executed by the processor, cause the processor to perform further acts of accessing an idempotent operation code library to retrieve executable instructions corresponding to the idempotent operations.

22. The system of claim 21, wherein a given one of the idempotent operations is executed after a precondition corresponding to the given one of the idempotent operations is satisfied.

23. The system of claim 17, wherein the virtualization system image is constructed from selected executable code drawn from a virtualization system image component library.

24. The system of claim 23 wherein the selected executable code is determined based at least in part on a status of at least one of the idempotent operations.

* * * * *